United States Patent
Chiang

(10) Patent No.: US 7,621,601 B2
(45) Date of Patent: Nov. 24, 2009

(54) BICYCLE HUB

(75) Inventor: Douglas Chiang, Taichung (TW)

(73) Assignee: Tien Hsin Industries Co., Ltd., Taichung County (TW)

( * ) Notice: Subject to any disclaimer, the term of this patent is extended or adjusted under 35 U.S.C. 154(b) by 40 days.

(21) Appl. No.: 11/943,587

(22) Filed: Nov. 21, 2007

(65) Prior Publication Data

US 2009/0127922 A1    May 21, 2009

(51) Int. Cl.
  *B60B 1/02* (2006.01)
  *B60B 27/00* (2006.01)
(52) U.S. Cl. ................... 301/59; 301/110.5
(58) Field of Classification Search ........... 301/55, 301/56, 59, 61, 104, 110.5
  See application file for complete search history.

(56) References Cited

U.S. PATENT DOCUMENTS 6,409,278 B1 *  6/2002  Nakajima ............... 301/59
7,354,114 B2 *  4/2008  Passarotto et al. ........ 301/104
7,360,847 B2 *  4/2008  Okajima et al. ........... 301/61
7,481,497 B2 *  1/2009  Mercat et al. ............. 301/59
2003/0173821 A1 *  9/2003  Chen ....................... 301/59
2006/0006730 A1 *  1/2006  Meggiolan ................ 301/59
2006/0197370 A1 *  9/2006  Mercat et al. ............. 301/59
2007/0284934 A1 * 12/2007  Chen ....................... 301/59
2008/0129105 A1 *  6/2008  Urbani et al. ............. 301/57

* cited by examiner

*Primary Examiner*—S. Joseph Morano
*Assistant Examiner*—Kip T Kotter

(57) ABSTRACT

A bicycle hub comprises a central tube having an axial receiving groove for installing an axial shaft of a wheel; a first peripheral disk formed at one end of the central tube; a second peripheral disk formed at another end of the central tube; the second peripheral disk being formed with a plurality of axial insertion holes for receiving radiation spokes; a peripheral of the second peripheral disk being formed with a plurality of ribs; each rib having a penetrating axial installing hole; and each rib of the first peripheral disk having a positioning groove; two ends of the positioning groove being opened at two lateral sides of the rib so as to form the openings; the positioning groove being approximately transversal to an axial direction of the installing hole and a lower side of the installing hole is opened to the positioning groove.

3 Claims, 4 Drawing Sheets

BICYCLE HUB

FIELD OF THE INVENTION

The present invention relates to bicycle hubs, and particularly to a bicycle hub which has a structure causing that the spokes of the bicycle can be installed easily and quickly. Thereby the structure is concrete so as to have a long lifetime.

BACKGROUND OF THE INVENTION

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle to make the bicycle more reliable and durable. Moreover, various components of the bicycle are constantly being modified and/or improved depending upon their use to be more aesthetically pleasing to the rider. In other words, it is often desirable to produce bicycles that are attractive to the rider. In addition, many riders desire a bicycle that looks different than other bicycles. Many bicycle frames are designed to have a distinctive and attractive appearance.

Recently, various covers have been proposed for covering portions of the front fork and/or the front hub. For example, a cover assembly has been proposed in U.S. Pat. No. 6,659,489 (Shimano Inc.) that provides an aesthetically pleasing look and a protection to the front hub. Basically, this Shimano patent discloses a pair of hub covers that are used with fork tube covers to provide an attractive appearance. However, the hub covers are not integrated with the hub design, and do not protect the center portion of the hub shell. Thus, the cover assembly does not provide a hub assembly with a look in which the hub cover and the hub shell are integrated together with a unified identity.

Another example of a hub that includes a cover member to protect the hub is disclosed in U.S. Pat. No. 5,795,036 (Campagnolo). In this Campagnolo patent, a covering ring is provided at the end of the hub which is integrated with the hub shell such that the covering ring and the hub shell has a sense of identify with each other. However, one major drawback to this design is that the ends of the hub axle are not covered. Thus, the ends of the hub axle are not protected and the end of the ends of the hub axle may detract from the appearance of the overall look of the hub.

In view of the above, it will be apparent to those skilled in the art from this disclosure that there exists a need for an improved a bicycle hub cover assembly. This invention addresses this need in the art as well as other needs, which will become apparent to those skilled in the art from this disclosure.

SUMMARY OF THE INVENTION

Accordingly, the primary object of the present invention is to provide a bicycle hub which has a structure causing that the spokes of the bicycle can be installed easily and quickly. Thereby the structure is concrete so as to have a long lifetime.

To achieve above objects, the present invention provides a bicycle hub, comprising: a central tube having an axial receiving groove for installing an axial shaft of a wheel; a first peripheral disk formed at one end of the central tube; a second peripheral disk formed at another end of the central tube; the second peripheral disk being formed with a plurality of radial insertion holes for receiving spokes; a peripheral of the first peripheral disk being formed with a plurality of ribs; each rib having a penetrating axial installing hole which penetrates through the rib and axially arranged along the axial direction of the central tube; and each rib of the first peripheral disk having a positioning groove; two ends of the positioning groove being opened at two lateral sides of the rib so as to form two openings; the positioning groove being approximately transversal to an axial direction of the installing hole and a lower side of the installing hole is opened to the positioning groove.

The central tube has an axial receiving groove for installing an axial shaft of a wheel. The installing hole having a larger opening at an inner side facing the second peripheral disk and has a smaller opening at an outer side opposite to the side. The opening at the inner side is greater than an enlarged head of a spoke; and the opening of the installing hole at the outer side is smaller than the enlarged head of the spoke.

The positioning groove has a V shape, and the installing hole is formed at an apex of the positioning groove so that the V shape positioning groove is approximately symmetrical with respect to the installing hole. A width of the opening in one lateral side of each rib being different from that of the opening in another lateral side of the same rib so that the spokes arranged at the positioning groove are arranged; and thus the spokes are alternately arranged.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
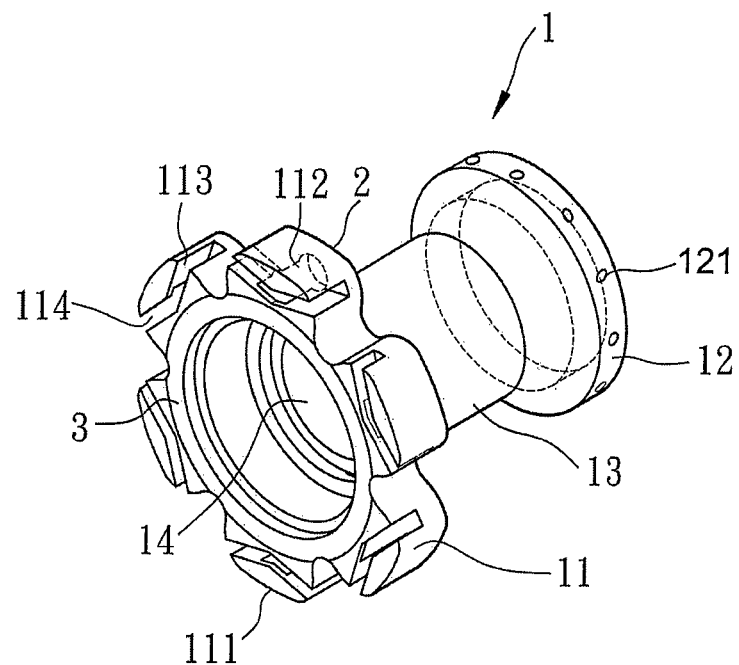
FIG. 1 is a schematic view of the bicycle hub of the present invention.
Figure 2:
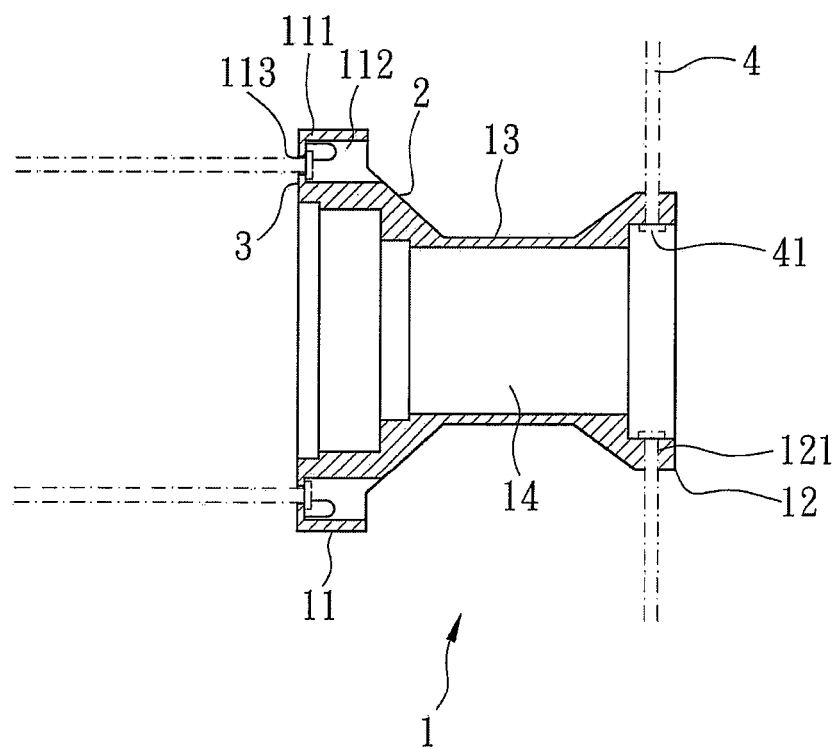
FIG. 2 is a schematic cross sectional view of the seat support structure of a bicycle of the present invention.

Referring to FIGS. 1 and 2, the bicycle hub of the present invention is illustrated. The present invention has the following elements.

A central tube 13 has an axial receiving groove 14 for installing an axial shaft of a wheel.

A first peripheral disk 11 is at one end of the central tube 13.

A second peripheral disk 12 is at another end of the central tube 13. The second peripheral disk 12 is formed with a plurality of radial insertion holes 121 for receiving spokes 4.

A peripheral of the first peripheral disk 11 is formed with a plurality of ribs 111. Each rib 111 has a penetrating axial installing hole 112 which penetrates through the rib 111 and axially arranged along the axial direction of the central tube 13. The installing hole 112_has a larger opening at an inner side 2 facing the second peripheral disk 12 and has a smaller opening at an outer side 3 opposite to the inner side 2. The opening at the inner side 2 is greater than an enlarged head 41 of a spoke 4. The opening of the installing hole 112 at the outer side 3 is smaller than the enlarged head 41 of the spoke 4. Thus, see FIG. 2, when the spoke 4 is installed in the installing hole 112, the enlarged head 41 can resist against the inside of the opening of the outer side 3.

Each rib 111 of the first peripheral disk 11 has a V shape positioning groove 113. Two ends of the V shape positioning groove 113 are opened at two lateral sides of the rib 111 so as to form two openings 114. The V shape of the positioning groove 113 is approximately transversal to an axial direction of the installing hole 112 and a lower side of the installing hole 112 is opened to the V shape positioning groove 113 and at an apex of the positioning groove 113 so that the V shape positioning groove 113 is approximately symmetrical with respect to the installing hole 112. A width of the opening 114 in one lateral side of each rib 111 is different from that of the opening 114 in another lateral side of the same rib 111 so that the spokes 4 arranged at the same V shape positioning groove 113 are staggeredly arranged. Thus the spokes 4 can be alternately arranged.

Figure 3:
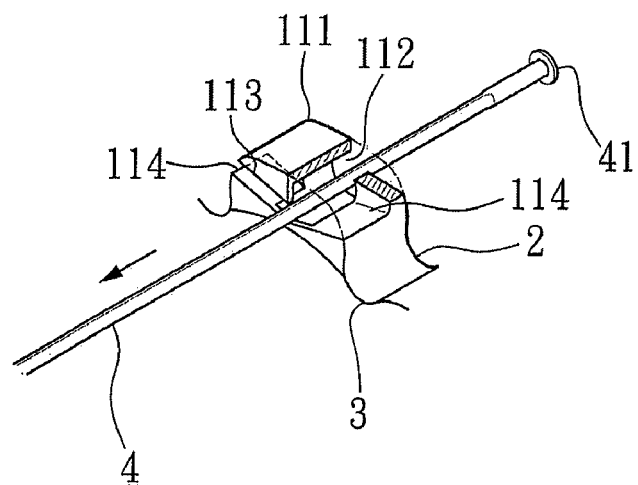
FIGS. 3 and 4 are schematic cross sectional views showing the installation of the spokes according to the present invention.
Figure 4:
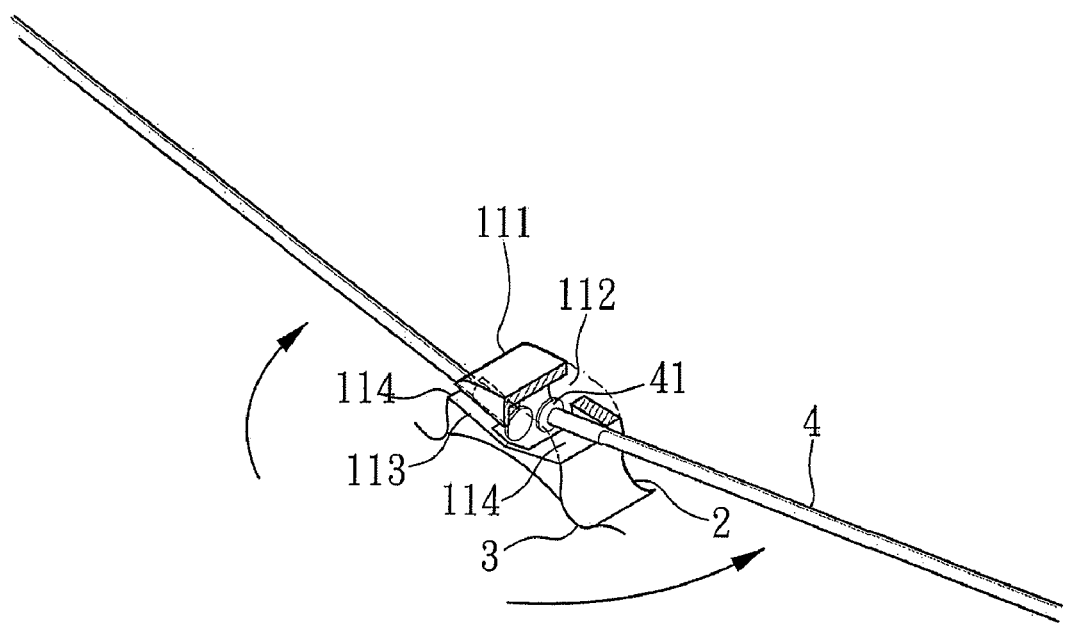

Referring to FIGS. 3 and 4, the arrangement of the present invention is illustrated. Firstly, one spoke 4 is inserted into an installing hole 112 with the enlarged head 41 of the spoke 4 is at the inner side 2. Then the spoke 4 is moved outwards until the enlarged head 41 is at an inner side of the installing hole 112. Then the spoke 4 is rotated through 90 degrees to a state illustrated in FIG. 4. At this state, the spoke 4 is located in one side of the V shape positioning groove 113. Then another spoke 4 is arranged at another side of the V shape positioning groove 113 with the same operation as above said. Thus the two spokes 4 are arranged at two sides of the V shape positioning groove 113. Because the two spokes 4 are at different sides of the positioning groove 113 and thus they have different depths.

Figure 5:
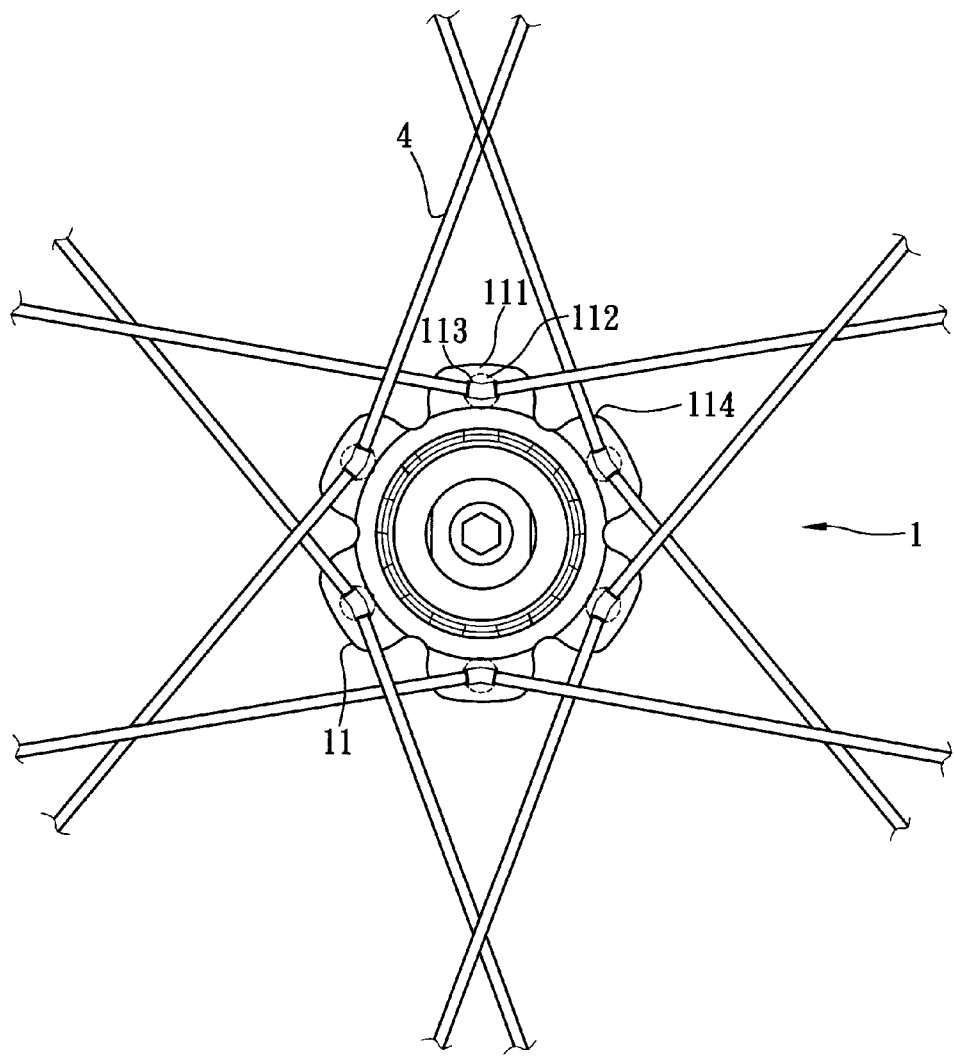
FIGS. 5 and 6 are assembly views of the present invention.
Figure 6:
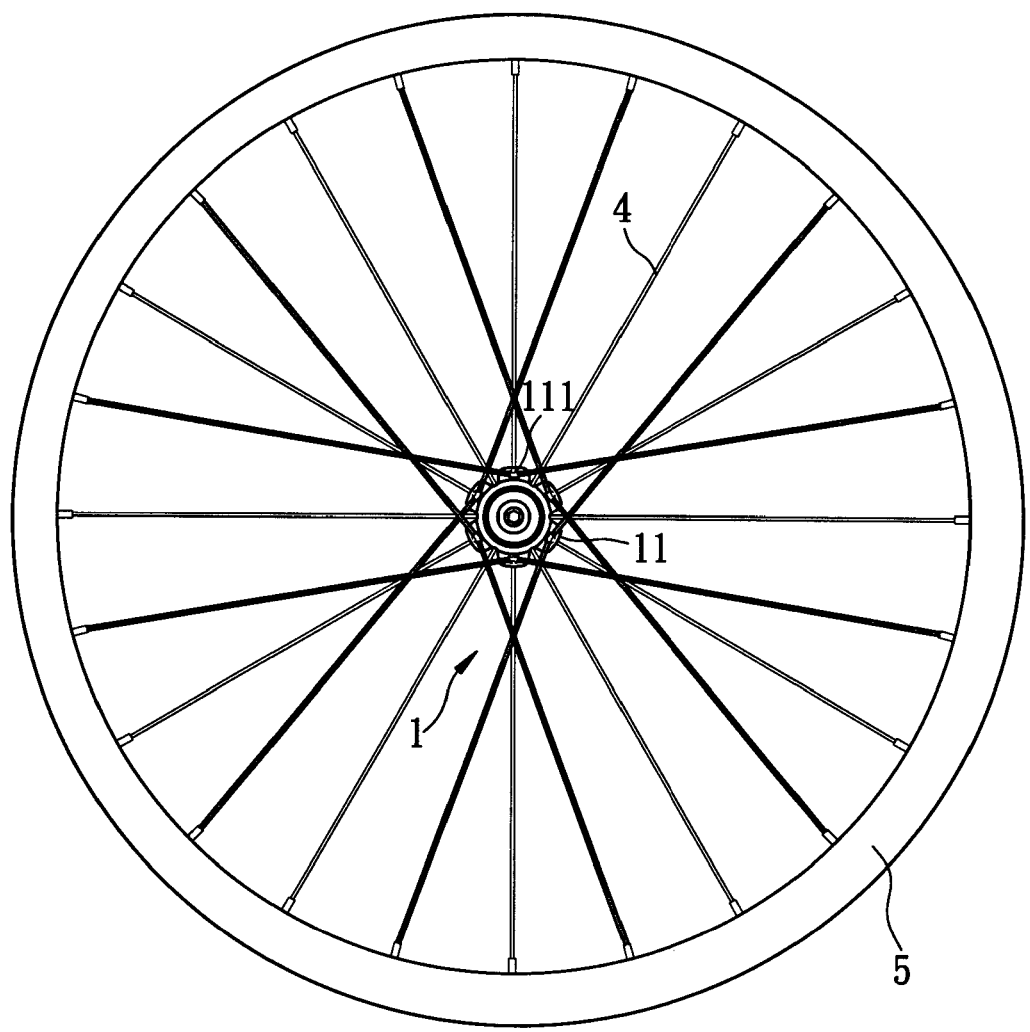

Referring to FIGS. 5 and 6, it is illustrated that a plurality of spokes 4 are installed at different ribs 111 so as to form the star like structure as illustrated in FIG. 5. In FIG. 6, it is illustrated that a plurality of spokes 4 are further installed the insertion holes 121 of the second peripheral disk 12. Then the whole hub 1 with the spokes 4 is installed to the wheel rim 5 to have a structure illustrated in FIG. 6 of the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A bicycle hub, comprising:
   a central tube having an axial receiving groove for installing an axial shaft of a wheel;
   a first peripheral disk formed at one end of the central tube;
   a second peripheral disk formed at another end of the central tube;
   the second peripheral disk being formed with a plurality of radial insertion holes for receiving spokes;
   a peripheral of the first peripheral disk being formed with a plurality of ribs; each rib having a penetrating axial installing hole which penetrates through the rib and axially arranged along the axial direction of the central tube; the installing hole having a larger opening at an inner side facing the second peripheral disk and having a smaller opening at an outer side opposite to the inner side; the opening at the inner side being greater than an enlarged head of a respective spoke; the opening of the installing hole at the outer side being smaller than the enlarged head of the respective spoke; and
   each rib of the first peripheral disk having a positioning groove; two ends of the positioning groove being opened at two lateral sides of the rib so as to form two openings; the positioning groove being approximately transversal to an axial direction of the installing hole and a lower side of the installing hole is opened to the positioning groove.

2. The bicycle hub as claimed in claim 1, wherein the positioning groove has a V shape, and the installing hole is formed at an apex of the positioning groove so that the V shape positioning groove is approximately symmetrical with respect to the installing hole.

3. The bicycle hub as claimed in claim 1, wherein a width of the opening in one lateral side of each rib being different from that of the opening in another lateral side of the same rib so that the spokes arranged at the positioning groove are staggeredly arranged; and thus the respective spokes are alternately arranged.

* * * * *